(12) United States Patent
Easley et al.

(10) Patent No.: US 11,317,702 B2
(45) Date of Patent: May 3, 2022

(54) TOOL TRANSER SYSTEM

(71) Applicant: Tenacious Holdings, Inc., St. Paul, MN (US)

(72) Inventors: James B. Easley, Mound, MN (US); Paul Michael Goudreau, Edina, MN (US); Nathan Bohmbach, Lakeville, MN (US)

(73) Assignee: Tenacious Holdings, Inc., St. Paul, MN (US)

( * ) Notice: Subject to any disclaimer, the term of this patent is extended or adjusted under 35 U.S.C. 154(b) by 139 days.

(21) Appl. No.: 16/879,287

(22) Filed: May 20, 2020

(65) Prior Publication Data

US 2020/0367633 A1    Nov. 26, 2020

Related U.S. Application Data

(60) Provisional application No. 62/850,540, filed on May 20, 2019.

(51) Int. Cl.
*F16B 21/02* (2006.01)
*A45F 5/02* (2006.01)
*A45F 5/00* (2006.01)

(52) U.S. Cl.
CPC .............. *A45F 5/021* (2013.01); *F16B 21/02* (2013.01); *A45F 2005/006* (2013.01); *A45F 2200/0575* (2013.01)

(58) Field of Classification Search
CPC ................ A45F 5/021; A45F 2005/006; A45F 2200/0575; F16B 21/02; F16B 21/04; Y10T 24/1397; Y10T 24/45052; Y10T 24/45262; Y10T 24/4578; Y10T 403/7005; Y10T 403/79; Y10T 403/7015
USPC .......................................... 224/254; 24/3.13
See application file for complete search history.

(56) References Cited

U.S. PATENT DOCUMENTS

| | | | | |
|---|---|---|---|---|
| 8,388,287 | B2 * | 3/2013 | Arnold | B60P 1/00 410/150 |
| 8,496,619 | B2 * | 7/2013 | Kramer | A61M 5/3007 604/135 |
| 9,038,873 | B2 * | 5/2015 | Moreau | A45F 5/021 224/269 |
| 9,351,558 | B2 * | 5/2016 | Burke | B25H 3/00 |
| 2016/0316902 | A1 * | 11/2016 | Votel | A45F 5/14 |
| 2021/0131485 | A1 * | 5/2021 | Bohmbach | F16B 2/22 |

* cited by examiner

*Primary Examiner* — Adam J Waggenspack
(74) *Attorney, Agent, or Firm* — Skaar Ulbrich Macari, P.A.

(57) ABSTRACT

A system for transferring an object from one user to another user that is useful to prevent unintentional dropping of the object is disclosed. A cam is rotatably connected to a structure that is configured to be attached to a first user. A central housing with two ports is configured to allow for the attachment of a tool by lanyard or other means. When the first cam is locked into the one of the housing ports, it cannot be released from the housing unless a second cam is inserted into the second housing port and captured. Once the second cam is captured the first cam is released, thus safely passing the tool from the first user to the second user while minimizing the chance of dropping the tool.

5 Claims, 5 Drawing Sheets

TOOL TRANSER SYSTEM

CLAIM OF BENEFIT TO PRIOR APPLICATIONS

This application claims the benefit of U.S. Provisional Application No. 62/850,540, filed May 20, 2019; and such application is hereby fully incorporated by reference herein.

FIELD OF THE INVENTION

This invention relates to the safe transfer of tools or other objects and more particularly to securely retaining and transferring tools and other objects when working above the ground so as to prevent accidental dropping of such objects. The invention is not limited to such uses, however.

BACKGROUND

When working with tools and other objects above ground there is a risk that the object might be unintentionally dropped. Even a small object can cause serious injury or significant property damage when falling from altitude. The present invention provides a system that significantly reduces the risk of injury or damage from unintentionally dropped objects.

SUMMARY

In general the form the invention provides a system for safely transferring a tool or other object that reduces the risk of a drop. The invention includes mounts that may be connected to a user at various locations, or other anchor points. The locations for the user include a wrist, tool pouch, belt, fall protection harness, glove, safety vest jacket, pants or other apparel. Other locations include an anchor strap, hoist bucket, hand rail, beam or other fixed anchor point. Each mount is configured with a rotatable cam that is alternately captured by a central housing.

The central housing is configured for the attachment of a tool by lanyard or other means. The spring assembly is an elongated structure that resides within the central housing. The spring assembly has two ends, each end being accessible through each respective end of the central housing. The spring assembly consists of a slidable enclosure that contains a spring. The spring enclosure maintains its full length because of the force of the spring. When the slideable enclosure is subject to axial compression, the enclosure is reduced in axial length. When the axial compression force is no longer applied, the force of the spring urges the slideable enclosure to its original length.

Each end of the central housing has an opening that allows the spring assembly to be accessed from the central housing. The central housing opening and spring assembly end form a port configured to accept a cam. Within the central housing there are surfaces upon which the cam will act. Each cam comprises several protrusions on its outer perimeter. In a preferred embodiment the protrusions are generally hexagon in shape and number four per cam. The port of the central housing is configured to accept the insertion of one of the rotatable cams.

Each rotatable cam has a void configured to accept the end of the spring assembly that protrudes from the port of the central housing.

The first and second cams are alternately locked into the port of the main housing such that when the first cam is locked into the housing, the second cam is released from the housing. The action of the cams, as the protrusions act on the angled interior surfaces of the housing, and the force of the spring assembly, act to rotate the cams to alternately lock them in place or release them from the housing. The ports of the main housing are configured to allow the rotatable first cam to be released from the housing only when the second cam is inserted into the second housing port. Thus, when one rotatable cam is captured by the housing the other rotatable cam is released. The first cam cannot be released unless the second cam is inserted into the second central housing port and captured. This system thus provides a continuous safety connection when transferring a tool or other object from one mount to another.

DESCRIPTION OF THE PREFERRED EMBODIMENTS

Figure 1:
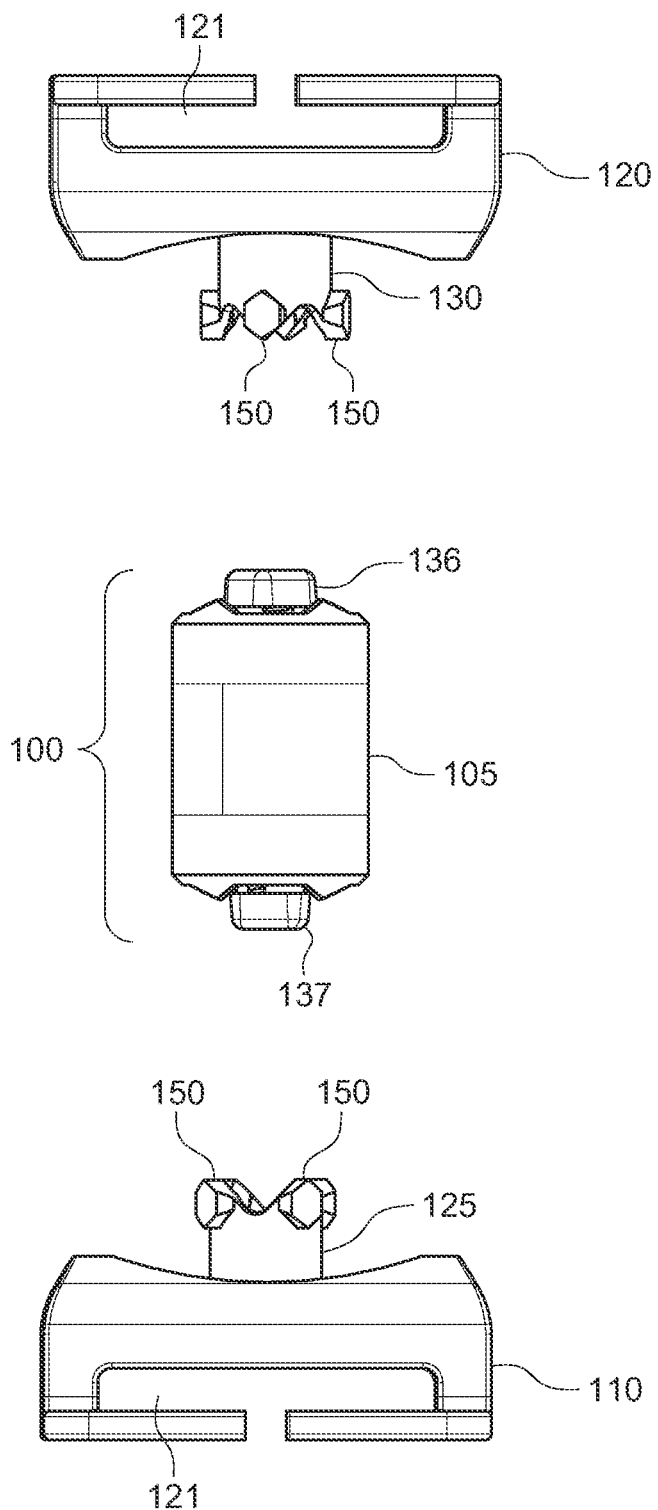
FIG. 1 is a front view of the subject tool transfer system separated into its three primary components.
Figure 2:
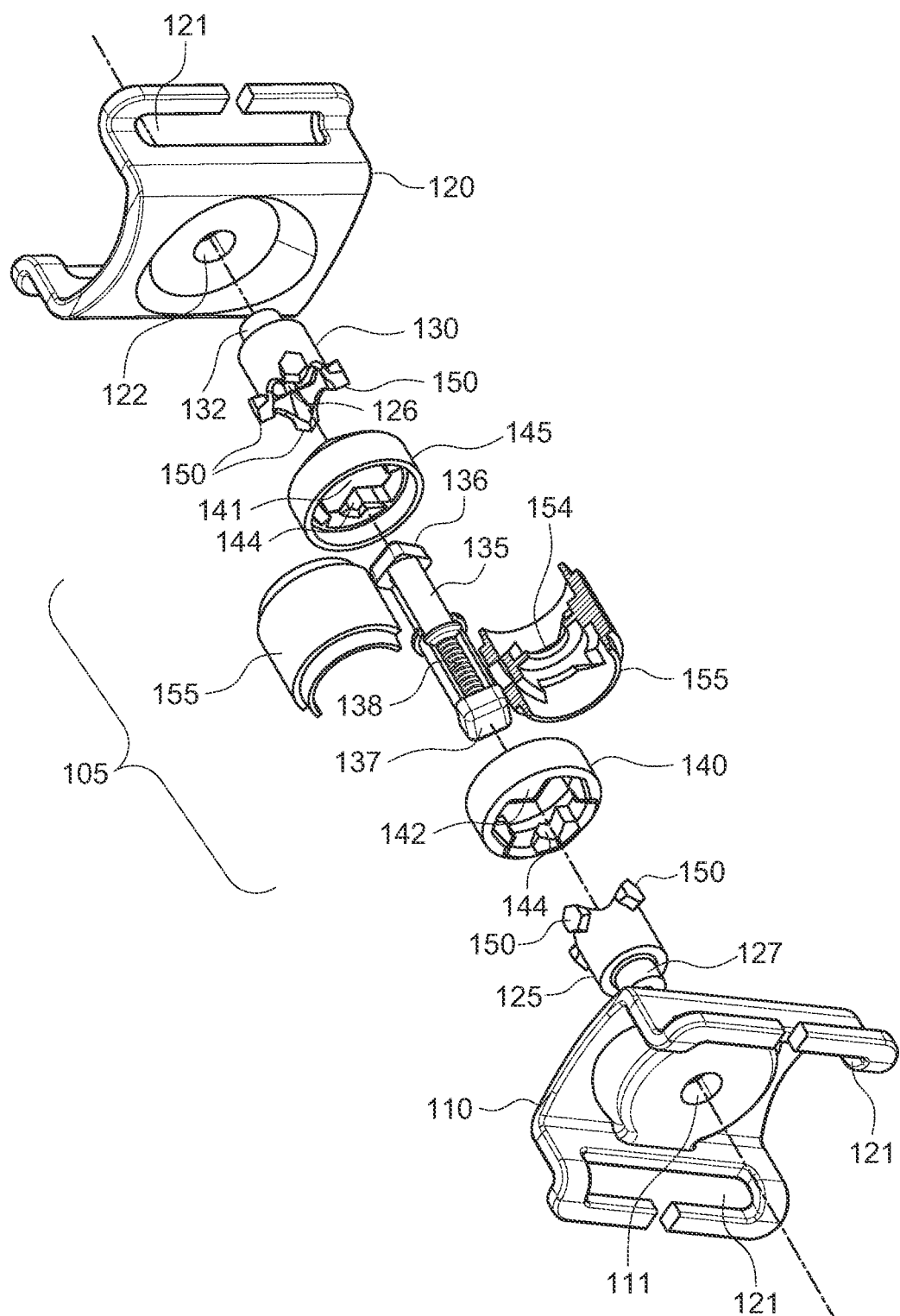
FIG. 2 is an exploded perspective view of the too transfer system shown in FIG. 1.
Figure 3:
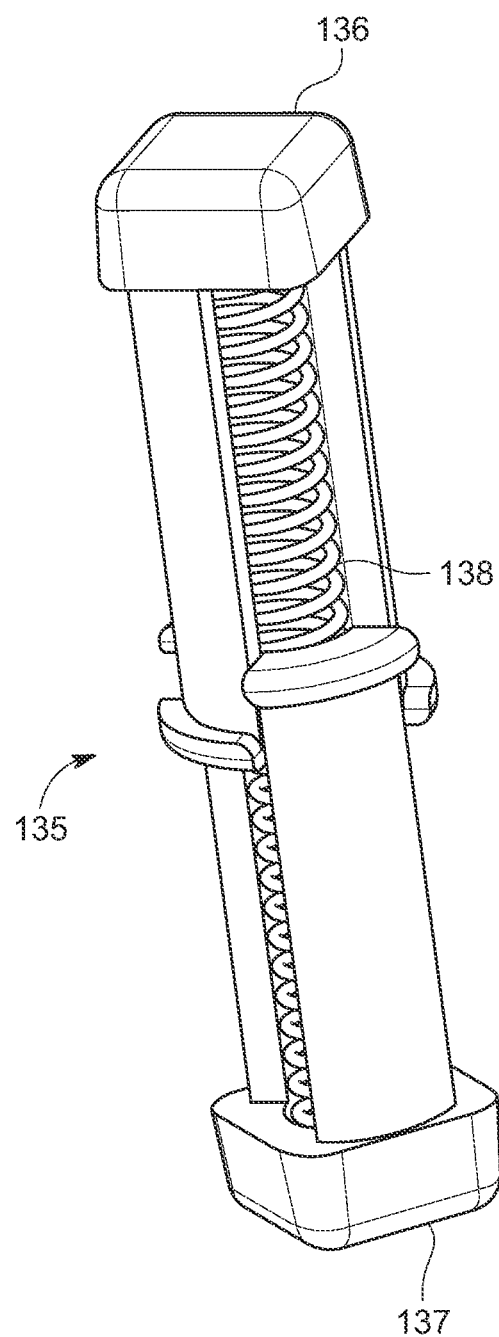
FIG. 3 is a view of Spring Assembly 135 that is held within the central housing 105 shown in FIGS. 1 and 2.
Figure 4:
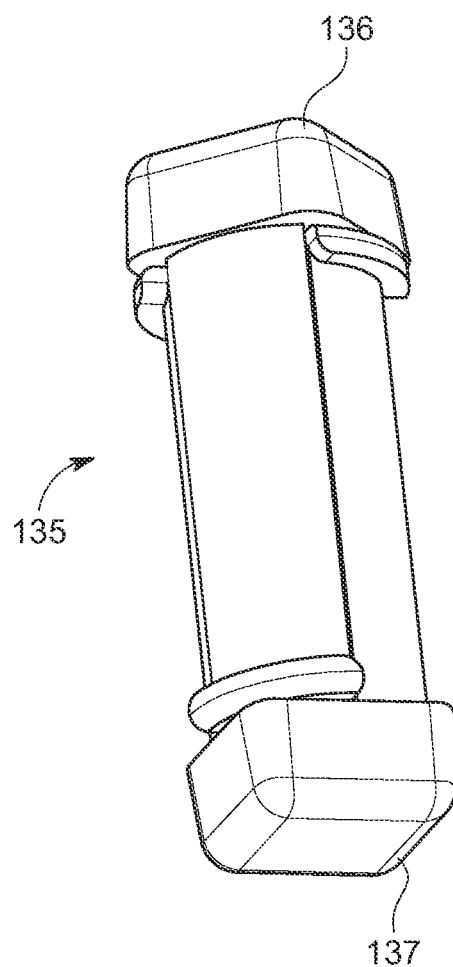
FIG. 4 is a view of Spring Assembly 135 in its fully compressed state.
Figure 5:
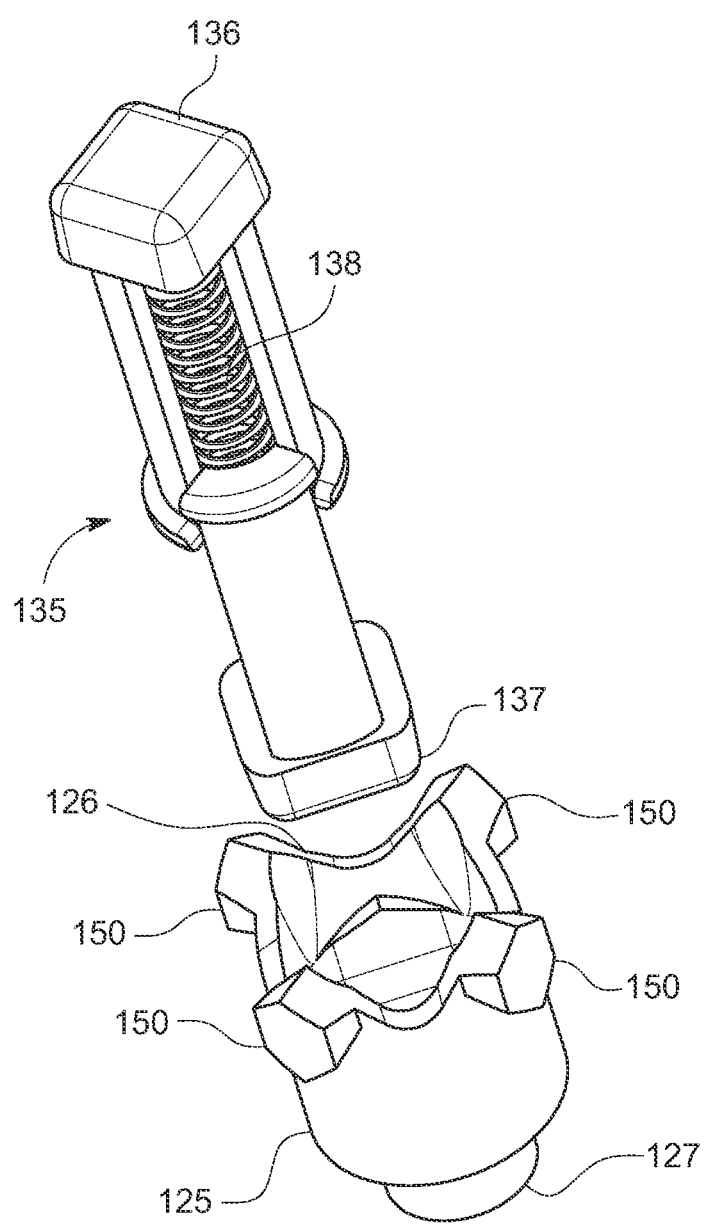
FIG. 5 is view of the Spring Assembly 135 as it is configured to be inserted into cam 125.

Considering FIGS. 1-5, tool transfer system 100 comprises three main structures: central housing 105, right attachment member 110 and left attachment member 120. Right attachment member 110 comprises cam 125 which is fixedly but rotatably mounted at cam end 127 to right attachment member 110 at central aperture 111. Right attachment member 110 also comprises attachment apertures 121 to allow for the securing of right attachment member to a first user. Left attachment member 120 comprises cam 130 which is fixedly but rotatably mounted at cam end 132 to left attachment member 120 at central aperture 122. The ends of cams 125 and 130 that interface with central housing 105 contain several spaced apart cam nodes 150. Each cam node 150 preferably has several angled surfaces. A hexagon embodiment is depicted. Cams 125 and 130 each define a central void 126. Left attachment member 110 also comprises attachment apertures 121 to allow for the securing of right attachment member to a second user.

Central housing 105 comprises spring slide 135, right collar 140, left collar 145 and side casings 155. Left collar 145 defines opening 141. Right collar 140 defines opening 142. The inside perimeter of collars 140 and 145 contain angled surfaces 144. Angled surfaces 144 cooperate with cam nodes 150 to rotate cams 125 and 130 to either secure a cam within central housing 105, or release a cam from housing 105. Attached to side casings 155 is one or more attachment structures 160. Spring assembly 135 is a slidable enclosure that contains spring 138.

Spring assembly 135 maintains its full length because of the force of spring 138. When the slideable enclosure 135 is subject to axial compression, the enclosure is reduced in axial length. When the axial compression force is no longer applied, the force of the spring urges the slideable enclosure to its original length. Spring guide 135 comprises internal spring 138, spring guide left end 136 and spring guide right end 137. Spring guide 135 urges cams 125 and 130 to alternately either lock a cam in place against the angled surface 144, or release the cam from central housing 105 by allowing a node of the cam to be released through a low point in angled surface 144. Cams 125 and 130 cooperate with spring assembly 135 and angled surfaces 144 to alternately lock cam 125 within central housing 105 and release cam 130 from central housing 105, and vice versa. Side casings 155 comprise securing portions 154 to secure spring assembly 135 within central housing 105.

In use the tool transfer system operates as in the following example. Right attachment member 110 is possessed by a first user and left attachment member 120 is possessed by a second user. In this example central housing 105 has a hand tool attached by lanyard to attachment structure 160, and the central housing 105 is attached to the right attachment member 110 possessed by the first user. If the first user wishes to transfer the hand tool to the second user, cam 130 of attachment member 120 is inserted into opening 141 of collar 145 of central housing 105. The spring assembly 135 is an elongated structure that is captured within central housing 105. Spring assembly 135 has two ends 136 and 137, each end being accessible through each respective ends of central housing 105 through opens 141 and 142 in collars 140 and 145. When cam 130 is inserted into opening 141 cam nodes 150 are urged to rotate by angled surface 144 of collar 145 and the force of spring assembly 135. The resulting rotation of cam 130 within collar 145 locks cam 132 into housing 105. At the same time, the force exerted on cam 125 by spring assembly 135, and long with the node surfaces acting against the angled surfaces 144, rotates cam 125 and releases cam 125 from housing 105, thereby completing the safe transfer of the hand tool.

While the invention has been described in connection with what is presently considered to be the most practical and preferred embodiments, it will be apparent to those of ordinary skill in the art that the invention is not to be limited to the disclosed embodiments. It will be readily apparent to those of ordinary skill in the art that many modifications and equivalent arrangements can be made thereof without departing from the spirit and scope of the present disclosure, such scope to be accorded the broadest interpretation of the appended claims so as to encompass all equivalent structures and products. Moreover, features or aspects of various example embodiments may be mixed and matched (even if such combination is not explicitly described herein) without departing from the scope of the invention.

For purposes of interpreting the claims for the present invention, it is expressly intended that the provisions of Section 112, sixth paragraph of 35 U.S.C. are not to be invoked unless the specific terms "means for" or "step for" are recited in a claim.

What is claimed is:

1. A tool transfer system comprising:
    a first attachment member configured to attach to a first user,
    the first attachment member having a first cam rotatably attached thereto, the first cam comprising a plurality of nodes on an outer perimeter;
    a second attachment member configured to attach to a second user, the second attachment member having a second cam rotatably attached thereto, the second cam comprising a plurality of nodes on an outer perimeter;
    a central housing having a side casing comprising an anchor point, a right end and a left end, the right end and the left end each defining an axial opening, each end having an interior surface adjacent to its opening containing angled protrusions configured to engage the nodes and rotate the inserted cam;
    a slideable spring assembly secured within the central housing and configured to engage and exert force on the first or second cam inserted into the central housing; and,
    wherein when the first cam is locked within the central housing the insertion of the second cam will thereby release the first cam and lock the second cam within the central housing.

2. The tool transfer system of claim 1 wherein the nodes are hexagon shaped.

3. An object transfer system comprising:
    a cylinder shaped central housing comprising an axially oriented and internal spring assembly, the central housing having a side casing comprising an anchor point, a right end port and a left end port;
    the spring assembly having a first end and a second end, the first end configured to protrude from the first end port of the central housing and the second end configured to protrude from the second end port of the central housing;
    a first cam sized to enter the first end port of the central housing and engage the first end of the spring assembly, the first cam configured to contact and compress the spring assembly and lock the first cam into the first end port of the central housing;
    a second cam sized to enter the second end port of the central housing and engage the second end of the spring assembly, the second cam configured to contact and compress the spring assembly and to lock the second cam into the second end port of the central housing;
    wherein when the first cam is locked into the first end port of the central housing, the second cam is released from the second end port of the central housing.

4. The object transfer system of claim 3 wherein the first and second cams each further comprise at least 4 nodes equally spaced a part on an outer perimeter.

5. The object transfer system of claim 3 wherein the central housing further comprises an anchor point for attaching an object thereto.

* * * * *